United States Patent [19]

Ohtagaki

[11] Patent Number: 5,442,554
[45] Date of Patent: Aug. 15, 1995

[54] SUSPENSION CONTROL SYSTEM

[75] Inventor: Shigeki Ohtagaki, Hyogo, Japan

[73] Assignee: Mitsubishi Denki Kabushiki Kaisha, Tokyo, Japan

[21] Appl. No.: 940,353

[22] Filed: Sep. 3, 1992

[30] Foreign Application Priority Data

Sep. 11, 1991 [JP] Japan .................. 3-231287

[51] Int. Cl.$^6$ .................. B60G 17/015
[52] U.S. Cl. .................. 364/424.05; 280/707
[58] Field of Search .............. 364/424.05; 280/707, 280/840

[56] References Cited

U.S. PATENT DOCUMENTS

| | | | |
|---|---|---|---|
| 4,621,832 | 11/1986 | Nakashima et al. | 364/424.05 |
| 4,629,212 | 12/1986 | Takizawa et al. | 364/424.05 |
| 4,717,173 | 1/1988 | Sugasawa et al. | 280/707 |
| 4,827,416 | 5/1989 | Kawagoe et al. | 364/424.05 |
| 4,984,820 | 1/1991 | Uchiyama et al. | 280/707 |
| 5,072,965 | 12/1991 | Wada | 280/707 |
| 5,133,574 | 7/1992 | Yamaoka et al. | 280/707 |
| 5,347,457 | 9/1994 | Tanaka et al. | 280/707 |

FOREIGN PATENT DOCUMENTS

| | | |
|---|---|---|
| 0157181 | 10/1985 | European Pat. Off. . |
| 0162449 | 11/1985 | European Pat. Off. . |
| 0167159 | 1/1986 | European Pat. Off. . |
| 3937841 | 5/1990 | Germany . |
| 55-114708 | 8/1980 | Japan . |

*Primary Examiner*—Gary Chin
*Attorney, Agent, or Firm*—Sughrue, Mion, Zinn, Macpeak & Seas; Richard C. Turner

[57] ABSTRACT

A suspension control system includes: a vehicle speed sensor for providing a signal representing a vehicle speed, a vehicle body behavior variation detecting device for detecting variations in behavior of a vehicle body, and a vehicle speed deciding device for calculating a vehicle speed from the signal provided by the vehicle speed sensor to compare the vehicle speed with a predetermined vehicle speed. The control system further includes a vehicle body behavior variation counter for counting vehicle body behavior variations for a predetermined period of time according to an output of the vehicle body behavior variation detecting device, a damping force changing device for changing a vehicle body suspension damping force at least in three steps and a damping force determining device for determining a damping force according to the vehicle speed decided by the vehicle speed deciding device and the number of vehicle body behavior variations counted by the vehicle body behavior variation counter, to apply an instruction signal to the damping force changing device, so that, when the vehicle speed decided by the vehicle speed deciding device is equal to or higher than a first predetermined vehicle speed, and when the number of vehicle body behavior variations counted by the vehicle body behavior variation counter is equal to or higher than a first predetermined value, the damping force changing device operates to increase the damping force to an increased value and to maintain the damping force at the increased value.

15 Claims, 4 Drawing Sheets

SUSPENSION CONTROL SYSTEM

BACKGROUND OF THE INVENTION

1. Field of the Invention

This invention relates to a suspension control system for a motor vehicle which allows a person to drive the motor vehicle with great comfort and with high stability.

2. Prior Art

In general, the comfort which one may feel while driving a motor vehicle (hereinafter referred to as "vehicle driving comfort") can be improved by decreasing the suspension damping force, while the stability in operation of the motor vehicle (hereinafter referred to as "vehicle driving stability") can be enhanced by increasing it. However, in this connection, it should be noted that if the damping force is set to a relatively low value, then the vehicle driving comfortableness is improved, but the vehicle driving stability is lowered; whereas if it is set to a relatively high value, then the vehicle driving stability is improved, but the vehicle driving comfort is lowered.

In order to overcome the above-described difficulties, a suspension control system has been proposed in the art which operates as follows (Japanese Utility Patent Application (OPI) No. 114708/1980 (the term "OPI" as used herein means an "unexamined published application")): When a motor vehicle travels at low speed, the vehicle driving comfortableness takes precedence over the vehicle driving stability; that is, the damping force is set to a low value; and when it travels at high speed, the damping force is switched over to a high value thereby to improve the vehicle driving stability.

However, it should be noted that the conventional suspension control system suffers from the following difficulties: That is, it is so designed that, when the motor vehicle is traveling at a high speed which is higher than a predetermined value, in order to enhance the vehicle driving stability the damping force is set to a relatively high value at the sacrifice of the riding comfort. Hence, with the conventional suspension control system, the motor vehicle may bound intermittently at the positions of road defects such as the seams of road surfaces; that is, the vehicle driving comfort is worsened in such a case.

SUMMARY OF THE INVENTION

Accordingly, an object of this invention is to solve the above-described difficulties. More specifically, an object of the invention is to provide a suspension control system which operates to maintain the vehicle driving stability when the vehicle speed is high and when vehicle body behavior variations occur so many times.

Another object of the invention is to provide a suspension control system which operates to automatically improve the vehicle driving comfort when the vehicle speed becomes lower than a predetermined value.

A further object of the invention is to provide a suspension control system which operates to automatically provide the best vehicle driving comfort when no vehicle body behavior variation occurs for a predetermined period of time.

A suspension control system according to the invention is able to change a vehicle body suspension damping force at least in three steps, and has damping force determining means for operating, when a vehicle speed detected is equal to or higher than a first predetermined vehicle speed, and when the number of vehicle body behavior variations is equal to or higher than a first predetermined value, to increase the damping force and maintain it.

Also, in a suspension control system according to the invention, when the vehicle speed is lower than a second predetermined vehicle speed which is lower than the first predetermined vehicle speed, the damping force determining means operates to switch a damping force held at a relatively high value back to the former.

Further, in a suspension control system according to the invention, when the damping force is held at a relatively high value, or when no vehicle body behavior variation occurs for a predetermined period of time, the damping force determining means operates to switch a current damping force back to the former.

In the suspension control system of the invention, the damping force determining means operates as follows: Even when the motor vehicle travels at high speed, normally the damping force determining means operates to set the damping force to a low value to improve the vehicle driving comfort. However, when the vehicle speed is equal to or higher than the first predetermined vehicle speed, or when the vehicle body behavior variations occur so many times that it is necessary to increase the damping force, the damping force determining means operates to hold the damping force at a relatively high value, thereby to maintain the vehicle driving stability.

Also, in the suspension control system of the invention, the damping force determining means operates as follows: When the vehicle speed becomes lower than a predetermined value, the damping force determining means operates to switch a damping force held at a relatively high value back to the former, so that the vehicle driving comfort is improved according to the vehicle speed.

Further, in the suspension control system of the invention, the damping force determining means operates as follows: When the damping force is held at a relatively high value, or when no vehicle body behavior variation occurs for the predetermined period of time, the damping force determining means operates to switch a current damping force back to the former, thereby to automatically improve the vehicle driving comfort.

DETAILED DESCRIPTION OF THE PREFERRED EMBODIMENTS

A suspension control system, which constitutes one embodiment of this invention, will be described with reference to the accompanying drawings.

Figure 1:
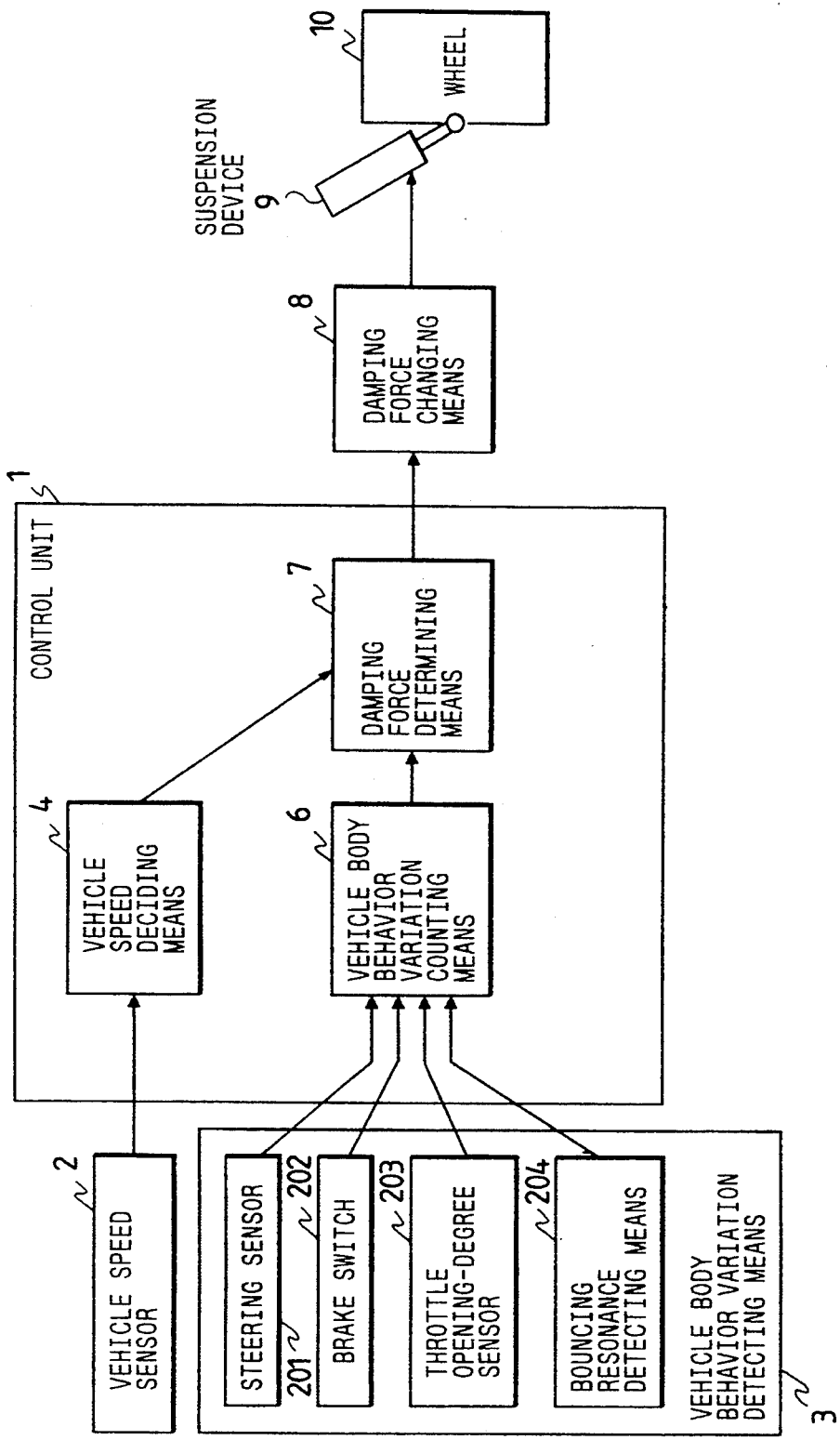
FIG. 1 is a block diagram showing the arrangement of a suspension control system according to one embodiment of this invention.

FIG. 1 is a block diagram showing the entire arrangement of the suspension control system according to the invention. In FIG. 1, reference numeral 1 designates a control unit (described later); and 2, a vehicle speed sensor.

Further in FIG. 1, reference numeral 3 designates vehicle body behavior variation detecting means which comprises: a steering sensor 201 for detecting an amount of operation of the steering wheel; a brake switch 202 for determining whether or not the brake has been operated; a throttle opening-degree sensor 203 for producing a signal representing a degree of opening of the throttle valve; and a bouncing resonance detecting means 204 for detecting a periodic vertical vibration of the vehicle body.

Detection of variations in behavior of the vehicle body is achieved when at least one of the components 201 through 204 of the vehicle body behavior variation detecting means 3 provides an output.

The outputs of the steering sensor 201, the brake switch 202, the throttle opening-degree sensor 203, and the bouncing resonance detecting means 204 are applied to means 6 for counting vehicle body behavior variations (hereinafter referred to as "vehicle body behavior variation counting means 6" or merely as "counting means 6") in the control unit 1.

The counting means 6, receiving the outputs of the vehicle body behavior variation detecting means 3, counts how many times the vehicle body behavior changes for a predetermined period of time, and applies the count value to a damping force determining means 7.

The control unit includes vehicle speed deciding means 4, which receives the output of the vehicle speed sensor 2 to calculate a vehicle speed, and compares the vehicle speed thus calculated with a predetermined value.

The vehicle speed calculated by the vehicle speed deciding means 4, and the number of vehicle body behavior variation counted by the counting means 6 are applied to the damping force determining means 7. The latter 7 utilizes the vehicle speed and the number of vehicle body behavior variation, to determine a suspension damping force.

The vehicle speed deciding means 4, the vehicle body behavior variation counting means 6, and the damping force determining means 7 form the control unit 1. The control unit 1 applies an instruction signal to a damping force changing means 8 so as to change the suspension damping force. Further in FIG. 1, reference numeral 9 designates a suspension device; and 10, a wheel.

Figure 2:
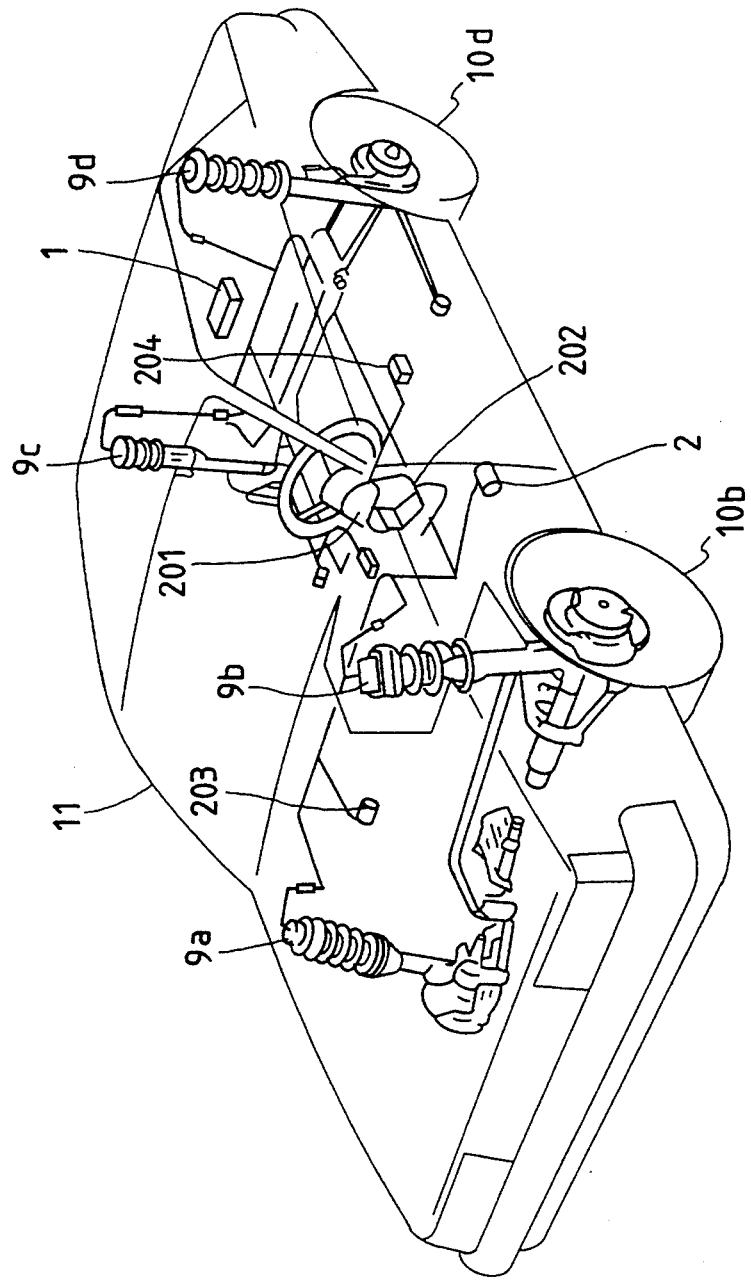
FIG. 2 is a perspective view of a motor vehicle in which the suspension control system of FIG. 1 is installed.
Figure 3:
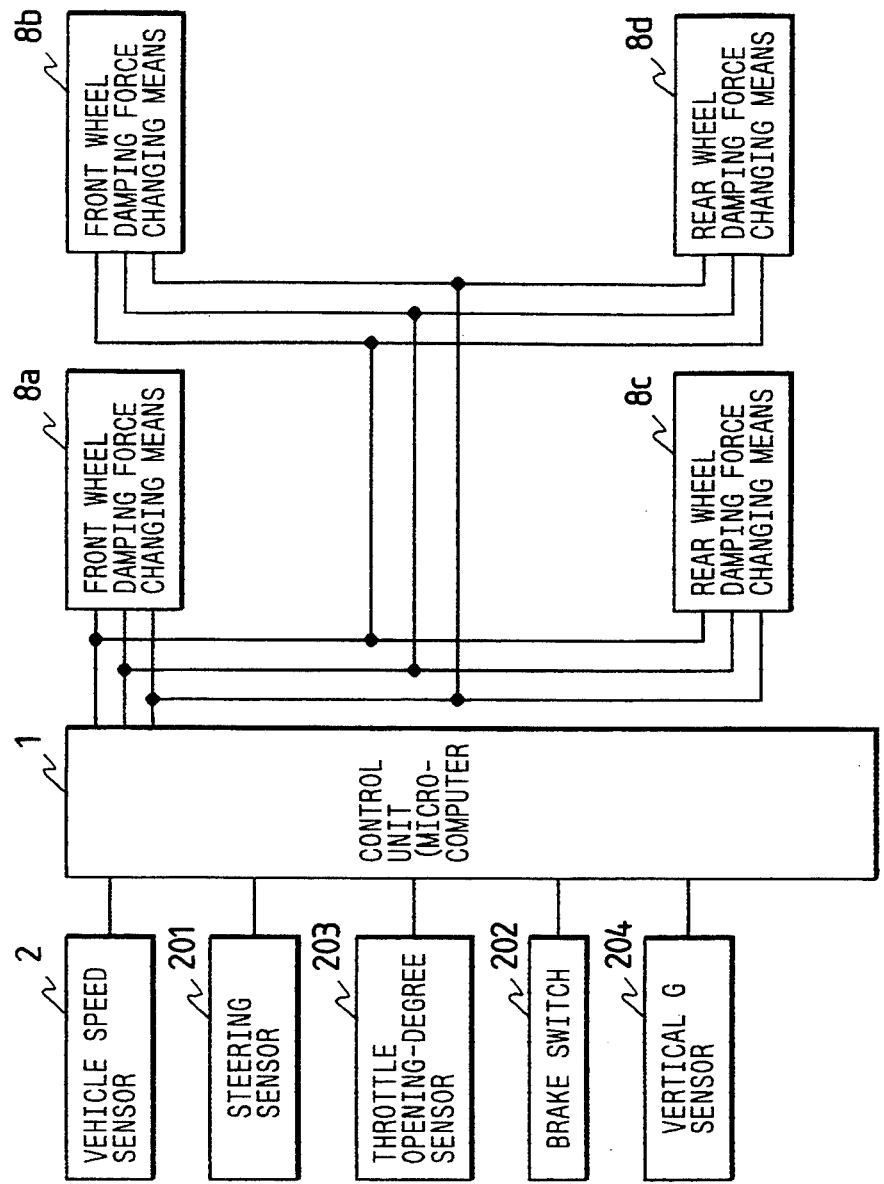
FIG. 3 is a block diagram showing the flow of operating signals in the suspension control system of FIG. 1.

FIG. 2 is an explanatory diagram showing a construction of a motor vehicle on which the suspension control system shown in FIG. 1 is mounted. FIG. 3 is a block diagram showing the flow of control signals in the embodiment shown in FIG. 1.

In FIGS. 2 and 3, parts which are the same as those in FIG. 1 are therefore designated by the same reference numerals. In FIGS. 2 and 3, reference numerals 1, 2, and 201 through 204 designate the same components as those in FIG. 1; however, hereinafter the bouncing resonance detecting means 204 will be referred to as "a vertical G sensor 204".

Further in FIGS. 2 and 3, reference characters 8a through 8d designate damping force changing units which are provided for the wheels 10a through 10d, respectively, corresponding to the aforementioned damping force changing means 8; and 11, the vehicle body. The wheels 10a through 10d correspond to the wheel 10 in FIG. 1. Instead of the vertical G sensor, a vehicle height sensor may be employed.

Figure 4:
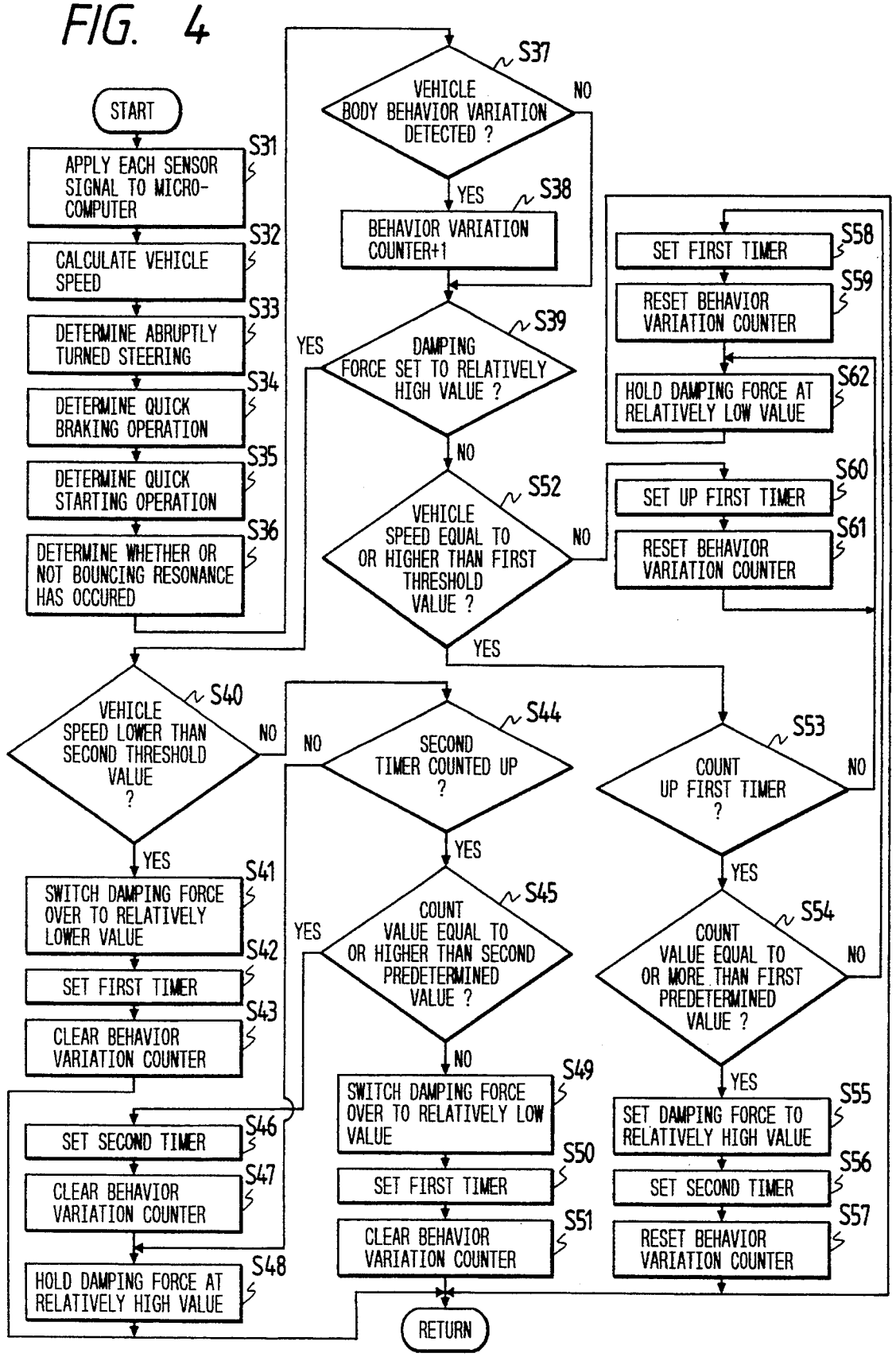
FIG. 4 is a flow chart for a description of the operation of the suspension control system of FIG. 1.

The operation of the suspension control system thus organized will be described with reference to a flow chart of FIG. 4.

Upon start, in Step S31, the output signals of the sensors are applied to a microcomputer (FIG. 3) in the control unit 1. Thereafter, in Step S32, a vehicle speed is calculated by using the output signal of the vehicle speed sensor 2.

In Step 33, a steering angular speed is calculated by using the output signal of the steering sensor 201, and it is determined from the vehicle speed and the steering angular speed whether or not the steering wheel has been turned abruptly.

In Step 34, it is detected from the output signal of the brake switch 202 how the braking condition is, and deceleration is calculated from the vehicle speed, to determine whether or not a quick braking operation has been done.

In Step 35, the output signal of the throttle (accelerator) opening-degree sensor 203 is utilized to detect an accelerator operating speed and a degree of opening of the throttle (accelerator), thereby to determine whether or not a quick starting operation or quick acceleration has been carried out.

Next, in Step 36, the output signal of the vertical G sensor 204 (which may be a vehicle height sensor) is utilized to determine whether or not a bouncing resonance has occurred. Thereafter, Step S37 is effected.

In Step S37, it is determined whether or not a vehicle body behavior variation has been detected in any one of Steps S32 through S36. When it is determined that a vehicle body behavior variation has been detected; that is, when the result of determination is "Yes", then Step S38 is effected. In Step S38, the behavior variation counter is incremented by one (+1), and then Step S39 is effected. If, in the aforementioned Step S37, it is determined that the vehicle body behavior variation has not occurred, Step S39 is effected.

In Step S39, it is determined whether or not the damping force has been set to a relatively high value. When it is determined that the damping force has been set to the relatively high value, Step S40 is effected. When it is determined that the damping force has been set to a relatively low value, then Step S52 is effected.

Initially, the damping force is set to a relatively low value. Therefore, Step S52 is effected. In Step S52, it is determined whether or not the vehicle speed calculated in Step S32 is eqaul to or higher than a first threshold value. When the vehicle speed is lower than the first threshold value, Step S60 is effected, in which a first timer is set up. Next, in Step S61, the behavior variation counter is reset (cleared), and then Step S62 is effected. In Step S62, the damping force is held at the relatively low value, and then the operation is returned to the first step.

When the vehicle speed is increased; that is, when it is determined in Step S52 that the vehicle speed is equal to or higher than the first threshold value, then Step S53 is effected. In Step S53, it is determined whether or not the first timer has counted up. Until the first timer counts up, Step S62 is effected, so that the damping force is held at the relatively low value.

When it is determined in Step S53 that the first timer has counted up, Step S54 is effected. In Step S54, it is determined whether or not the count value of the vehicle body behavior variation counting means 6 operated in Step S38 has reached a first predetermined value.

When the variation in behavior of the vehicle body 11 is small; that is, when the count value of the counting means 6 is lower than the first predetermined value, Step S58 is effected to set the first timer. Thereafter, Step S59 is effected to reset (clear) the contents of the vehicle body behavior variation counting means 6. Then, Step S62 is effected, so that the damping force is held at the relatively low value. Thereafter, counting the variations in behavior of the vehicle body is started again.

On the other hand, when variations in behavior of the vehicle body 11 occur successively; that is, when it is determined in Step S54 that the count value of the vehicle body behavior variation counting means 6 is equal to or higher than the first predetermined value, it is decided that the damping force should be set to a relatively high value thereby to enhance the vehicle driving stability. That is, in Step S55, the damping force is switched over to a relatively high value. Thereafter, Step S56 is effected to set a second timer, and then in Step S57 the behavior variation counter is cleared.

When the damping force has been switched over to the relatively high value, then the following operations are carried out to determine whether the damping force should be held at the relatively high value or whether it should be switched back to the relatively low value:

When it is determined in Step S39 that the damping force has been held at the relatively high value, Step S40 is effected. In Step S40, it is determined whether or not the vehicle speed calculated in Step S32 is equal to or higher than a second threshold value which is lower than the first threshold value.

When it is determined that the vehicle speed is lower than the second threshold value, then Step S41 is effected to switch the damping force over to a relatively lower value, and then Step S42 is effected. In Step S42, the first timer is set. Next, in Step S43, the behavior variation counter is cleared. Thus, the damping force is held at the relatively low value until, the vehicle speed being increased, it becomes necessary to determine whether the damping force should be switched over to the relatively high value or not.

When it is determined in Step S40 that the vehicle speed is equal to or higher than the second threshold value, Step S44 is effected. In Step S44, it is determined whether or not the second timer has counted up. When it is determined that the second timer has not counted up; that is, when the result of determination is "No", then Step S48 is effected to hold the damping force at the relatively high value.

When it is determined Step S44 that the second timer has counted up, then Step S45 is effected to determine whether or not the count value of the vehicle body behavior variation counting means 6 is equal to or higher than a second predetermined value.

When it is determined in the aforementioned Step S45 that the count value of the vehicle body behavior variation counting means 6 is equal to or higher than the second predetermined value, then in order to determine whether the damping force should be held at a relatively high value once and then held at the relatively high value again or whether it should be switched over to the relatively low value, Step S46 is effected. In Step S46, the second timer is set. In Step S47, the count value of the vehicle body behavior counting means 6 is cleared. Thereafter, in Step S48, the damping force is held at the relatively high value.

When it is determined in the aforementioned Step S45, the count value of the vehicle body behavior variation counting means 6 is lower than the second predetermined value, it is decided that no vehicle body behavior variation occurs, and the traveling conditions are stable; that is, it is decided that it is unnecessary to maintain the damping force at the relatively high value to enhance the vehicle driving stability. Hence, in order to improve the vehicle driving comfort, Step S49 is effected. In Step S49, the damping force is switched over to the relatively low value. Thereafter, in Step S50, the first timer is set. In Step S51, the count value of the vehicle body behavior variation counting means 6 is cleared so that the device be ready for the following determination that the damping force should be increased.

In the suspension control system as described above, the damping force determining means operates when the vehicle speed calculated by the vehicle speed deciding means is equal to or higher than the first predetermined vehicle speed and when the number of vehicle body behavior variations counted is equal to or higher than the first predetermined value, so that the damping force changing means increases the damping force and maintains the damping force thus increased. Hence, only when the vehicle speed is high and it is necessary to enhance the vehicle driving stability, the damping force is held high, and the vehicle driving stability is maintained high.

Also, in the suspension control system of the invention, when the vehicle speed becomes lower than the second predetermined vehicle speed which is lower than the first predetermined vehicle the damping force determining means operates to switch the vehicle speed held at a relatively high value back to the relatively low value. Hence, as the vehicle speed decreases, the vehicle driving comfort is automatically improved.

Further, in the suspension control system of the invention, the damping force determining means operates as follows: That is, when the damping force is held at a relatively high value, or when no vehicle body behavior variations occurs for the predetermined period of time, the damping force determining means operates to switch the present damping force to the relatively low value, so that the vehicle driving comfort is automatically improved.

What is claimed is:

1. A suspension control system for use in a vehicle, comprising:
a vehicle speed sensor for sensing a vehicle speed to provide a signal representing said vehicle speed;
vehicle body behavior variation detecting means for detecting variations in a steering angular speed which indicates whether said vehicle is abruptly turned;
vehicle speed determining means for calculating a vehicle speed from said signals provided by said vehicle speed sensor and comparing said calculated vehicle speed with a value representing a predetermined vehicle speed;
vehicle body behavior variation counting means for counting said variations in the steering angular speed for a predetermined period of time according to an output of said vehicle body behavior variation detecting means;

damping force changing means for changing a vehicle body suspension damping force; and damping force determining means for determining a damping force according to said vehicle speed determined by said vehicle speed determining means and the number of variations in the steering angular speed counted by said vehicle body behavior variation counting means, to apply an instruction signal to said damping force changing means, so that, when said vehicle speed determined by said vehicle speed determining means is equal to or higher than a first predetermined vehicle speed, and when the number of said variations in the steering angular speed counted by said vehicle body behavior variation counting means is equal to or higher than a first predetermined value, said damping force changing means operates to increase said damping force to an increased value and to maintain said damping force at said increased value.

2. A suspension control system as claimed in claim 1, wherein when said vehicle speed is lower than a second predetermined vehicle speed which is lower than said first predetermined vehicle speed, said damping force determining means operates to switch a damping force held at said increased value, which is a relatively high value, back to a value lower than said increased value.

3. A suspension control system as claimed in claim 1, wherein when said damping force is held at said increased value, which is a relatively high value, and none of said variations in the steering angular speed occurs for the predetermined period of time, said damping force determining means operates to switch a current damping force back to a value lower than said increased value.

4. A suspension control system for use in a vehicle, comprising;
a vehicle speed sensor for sensing a vehicle speed to provide a signal representing said vehicle speed;
vehicle body behavior variation detecting means for detecting variations in a braking condition which indicates whether said vehicle is abruptly braked;
vehicle speed determining means for calculating a vehicle speed from said signals provided by said vehicle speed sensor and comparing said calculated vehicle speed with a value representing a predetermined vehicle speed;
vehicle body behavior variation counting means for counting said variations in the braking condition for a predetermined period of time according to an output of said vehicle body behavior variation detecting means;
damping force changing means for changing a vehicle body suspension damping force; and
damping force determining means for determining a damping force according to said vehicle speed determined by said vehicle speed determining means and the number of variations in the braking condition counted by said vehicle body behavior variation counting means, to apply an instruction signal to said damping force changing means so that when said vehicle speed determined by said vehicle speed determining means is equal to or higher than a first predetermined vehicle speed, and when the number of said variations in the braking condition counted by said vehicle body behavior variation counting means is equal to or higher than a first predetermined value, said damping force changing means operates to increase said damping force to an increased value and to maintain said damping force at said increased value.

5. A suspension control system as claimed in claim 4, wherein when said vehicle speed is lower than a second predetermined vehicle speed which is lower than said first predetermined vehicle speed, said damping force determining means operates to switch a damping force held at said increased value, which is a relatively high value, back to a value lower than said increased value.

6. A suspension control system as claimed in claim 4, wherein when said damping force is held at said increased value, which is a relatively high value, and none of said variations in the braking condition occurs for the predetermined period of time, and damping force determining means operates to switch a current damping force back to a value lower than said increased value.

7. A suspension control system for use in a vehicle, comprising:
a vehicle speed sensor for sensing a vehicle speed to provide a signal representing said vehicle speed;
vehicle body behavior variation detecting means for detecting variations in behavior of a vehicle body;
vehicle speed determining means for calculating a vehicle speed from said signal provided by said vehicle speed sensor and comparing said calculated vehicle speed with a value representing a predetermined vehicle speed;
vehicle body behavior variation counting means for counting said vehicle body behavior variations for a predetermined period of time according to an output of said vehicle body behavior variation detecting means;
damping force changing means for changing a vehicle body suspension damping force; and
damping force determining means for determining a damping force according to said vehicle speed determined by said vehicle speed determining means and the number of vehicle body behavior variations counted by said vehicle body behavior variation counting means, to control said damping force changing means in the following manner:
when the vehicle speed determined by said vehicle speed determining means is lower than a first predetermined vehicle speed, and said damping force is set to a low value, said damping force changing means operates to maintain said damping force at said low value regardless of whether any said vehicle body behavior variation has occurred during the predetermined period of time;
when said vehicle speed determined by said vehicle speed determining means is equal to or higher than said first predetermined vehicle speed, said damping force is set to a low value, and the number of said vehicle body behavior variations counted by said vehicle body behavior variation counting means during the predetermined period of time is equal to or higher than a first predetermined value, said damping force changing means operates to increase said damping force to an increased value and to maintain said damping force at said increased value;
when said damping force is set to a high value, and said vehicle speed detected by said vehicle speed determining means is lower than a second predetermined vehicle speed, said damping force changing means operates to return said damping force to said low value; and when said damping force is set to a high value, and said vehicle speed detected by said vehicle speed determining means is equal to or higher than said second predetermined vehicle speed, said damping force changing means operates to maintain said damping force at said high value if said damping force has not been at said high value for a determined period of time.

8. A suspension control system as claimed in claim 7, wherein said damping force determining means further controls said damping force changing means so that when said damping force is set to a high value, and said vehicle speed detected by said vehicle speed determining means is equal to or higher than said second predetermined vehicle speed, said damping force changing means operates to maintain said damping force at said high value if said damping force has been at said high value for said determined period of time and the number of said vehicle body behavior variations counted by said vehicle body behavior variation counting means is equal to or higher than a second predetermined value.

9. A suspension control system as claimed in claim 7, wherein said damping force determining means further controls said damping force changing means so that when said damping force is set to a high value, and said vehicle speed detected by said vehicle speed determining means is equal to or higher than said second predetermined vehicle speed, said damping force changing means operates to return said damping force to said low value if said damping force has been at said high value for said determined period of time and the number of said vehicle body behavior variations counted by said vehicle body behavior variation counting means is less than a second predetermined value.

10. A suspension control system as claimed in claim 7, wherein said damping force determining means further controls said damping force changing means so that when said vehicle speed detected by said vehicle speed determining means is equal to or higher than said first predetermined vehicle speed, said damping force is set to said low value, and the number of said vehicle body behavior variations counted by said vehicle body behavior variation counting means is lower than said first predetermined value, said damping force changing means operates to keep said damping force at said low value.

11. A suspension control system as claimed in claim 8, wherein said damping force determining means further controls said damping force changing means so that:
when said damping force is set to a high value, and said vehicle speed detected by said vehicle speed determining means is equal to or higher than said second predetermined vehicle speed, said damping force changing means operates to return said damping force to said low value if said damping force has been at said high value for said determined period of time and the number of said vehicle body behavior variations counted by said vehicle body behavior variation counting means is less than said second predetermined value; and
when said vehicle speed detected by said vehicle speed determining means is equal to or higher than said first predetermined vehicle speed, said damping force is set to said low value, and the number of said vehicle body behavior variations counted by said vehicle body behavior variation counting means is lower than said first predetermined value, said damping force changing means operates to keep said damping force at said low value.

12. A suspension control system as claimed in claim 7, wherein the behavior of said vehicle body detected by said vehicle body behavior variation detecting means is a steering angular speed which indicates whether said vehicle is abruptly turned.

13. A suspension control system as claimed in claim 11, wherein the behavior of said vehicle body detected by said vehicle body behavior variation detecting means is a steering angular speed which indicates whether said vehicle is abruptly turned.

14. A suspension control system as claimed in claim 7, wherein the behavior of said vehicle body detected by said vehicle body behavior variation detecting means is a braking condition which indicates whether said vehicle is abruptly braked.

15. A suspension control system as claimed in claim 11, wherein the behavior of said vehicle body detected by said vehicle body behavior variation detecting means is a braking condition which indicates whether said vehicle is abruptly braked.

* * * * *